Aug. 29, 1933.  C. W. DIETRICH  1,924,983
VEHICLE HEADLIGHT
Filed April 2, 1932
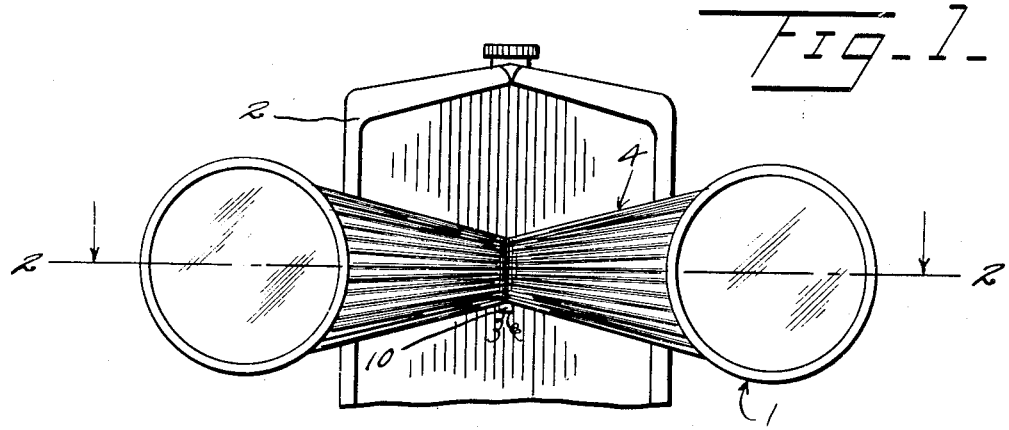
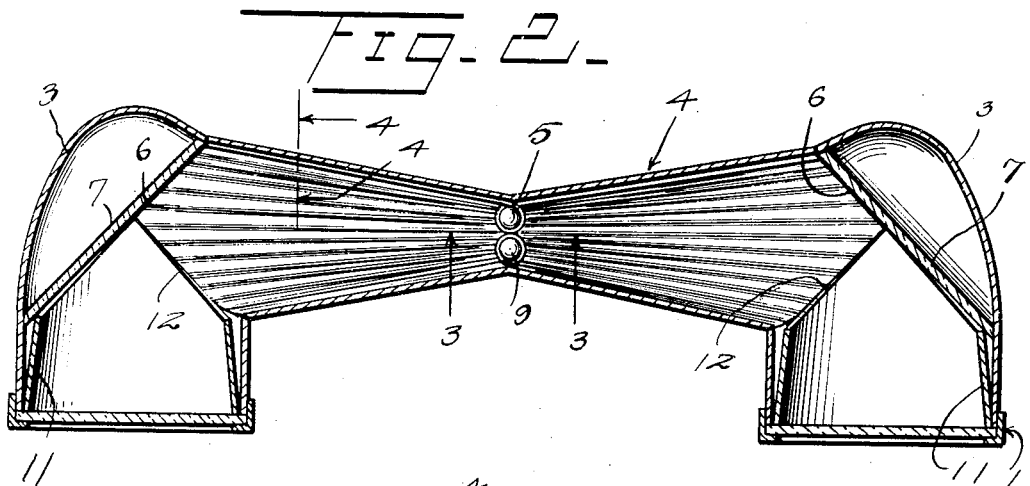
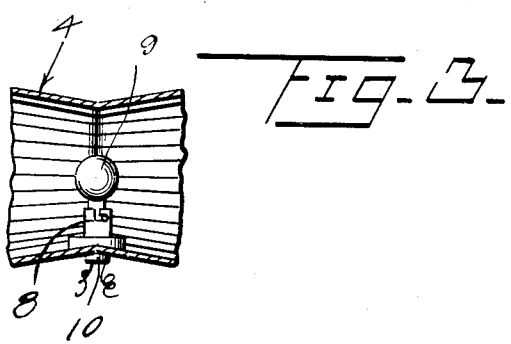
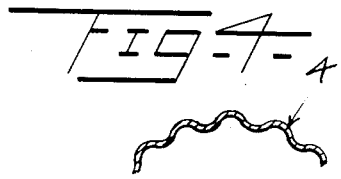
Inventor
C. W. Dietrich
By Watson E. Coleman
Attorney Patented Aug. 29, 1933

1,924,983

UNITED STATES PATENT OFFICE 1,924,983

VEHICLE HEADLIGHT

Clarence William Dietrich, Saginaw, Mich.

Application April 2, 1932. Serial No. 602,808

2 Claims. (Cl. 240—7.1)

This invention relates to improvements in headlights for vehicles and pertains particularly to motor vehicles.

The primary object of the present invention is to provide a headlight structure which will prevent the annoying condition of having to drive a motor vehicle with only a single burning headlight when one of the headlight bulbs burn out.

Another object of the invention is to provide a headlight structure in which a connecting casing is mounted between two projector casings, in which connecting casing one or more incandescent bulbs are mounted to supply light rays to both of the projector casings to which the connecting casing is attached.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in front elevation of the structure embodying the present invention;

Figure 2 is a longitudinal sectional view taken on the horizontal line 2—2 of Figure 1;

Figure 3 is a sectional view taken substantially upon the line 3—3 of Figure 2;

Figure 4 is a sectional view taken substantially upon the line 4—4 of Figure 2.

Referring now more particularly to the drawing wherein like numerals of reference indicate corresponding parts throughout the several views, the numeral 1 indicates generally the structure embodying the present invention, which structure may be mounted in any suitable manner before the radiator 2 of a motor vehicle, the preferred method being, however, to mount the structure upon the usual fender tie rod.

The invention consists in disposing between the projector casings 3 of the motor vehicle, the double cone casing 4 which is constricted at its transverse center, as indicated at 5, and has its outer ends of materially greater diameter than the central portion, as shown. This connecting casing has each end opening through a suitable aperture 6 formed in the side of a projector casing 3 and disposed obliquely of the connecting casing and within each projector casing is a mirror 7. These mirrors are preferably disposed at an angle of approximately 45° to the longitudinal centers of the projector casings and the connecting or lamp housing casing 4. Within the casing 4 at the constricted portion therein is mounted one or more incandescent lamp sockets 8 in which a lamp 9 of any suitable character is placed, the lead-in wires for the lamps 9 passing through the lower part of the connecting casing 4, as indicated at 10.

The portions of the connector casing 4 are preferably fluted or corrugated as illustrated so that the grooves or valleys and ridges of the corrugations will extend longitudinally thereof.

Within the front part of each projector casing 3 is a tapered shell 11 which is of circular cross section and at its rear end or the end of smallest diameter each shell is cut from opposite sides at angles of approximately 45° to the longitudinal axis forming the edges 12. One of these edges of each shell positions against the face of the adjacent reflector 7, while the other edge is directed toward the adjacent end of the lamp casing 4, as shown in Figure 2.

As will be readily seen from the foregoing a motor vehicle when equipped with the headlight structure herein described will never have to run with one headlight burning and the other not burning, as is frequently the case where an incandescent bulb is placed in each projector casing, for the one or more bulbs placed at the constricted portion of the intermediate or connecting casing 4 supply light to both projectors and if two bulbs are employed as shown in Figure 2 the same amount of light will be obtained from the projector casing as would be the case if each bulb were placed in a projector casing and if one of the bulbs burns out both projector casings will receive light rays from the remaining bulb so that two headlights will always show.

The light bulbs 9 may be readily inserted or removed by removing one of the projector rims and lenses and inserting the hand into the projector and along the adjacent cone or body portion of the casing 4, the interior diameter of the casing being made sufficient for this purpose.

Having thus described the invention, what is claimed is:—

1. In a vehicle headlight structure, a pair of spaced projector casings arranged with the axial centers thereof substantially parallel, a body connecting the adjacent sides of said casings comprising a tubular casing constricted about its transverse center and of gradually increasing diameter from the said center to each end, each of said ends opening through the side of a projector casing, an incandescent light source within said tubular casing at the constricted point thereof, a reflecting body within each of said projector casings and disposed obliquely thereof and with respect to said tubular casing, and a sleeve body within each of said projector casings between the reflecting body therein and the front thereof and having its interior surface polished.

2. A vehicle headlight structure, comprising a pair of projector casings disposed in spaced relation, a removable transparent closure frame for each casing, a transparent closure secured in position by each of said frames, a double conical tubular casing disposed between and connecting said first casings, said tubular casing being constricted intermediate its ends and of gradually and constantly increasing diameter from the constricted area to its point of connection with the first mentioned casings, said tubular casing being formed with corrugations extending longitudinally thereof, a reflector disposed at approximately 45° in each of said first casings to the longitudinal center of the tubular casing and the longitudinal centers of the first casings, an interiorly polished reflector sleeve disposed in each of said first casings and contacting at its inner end with the adjacent reflector and engaged at its outer end with the adjacent transparent closure, and illuminating means within the tubular casing at the point of constriction thereof.

CLARENCE WILLIAM DIETRICH.